United States Patent Office 3,560,587
Patented Feb. 2, 1971

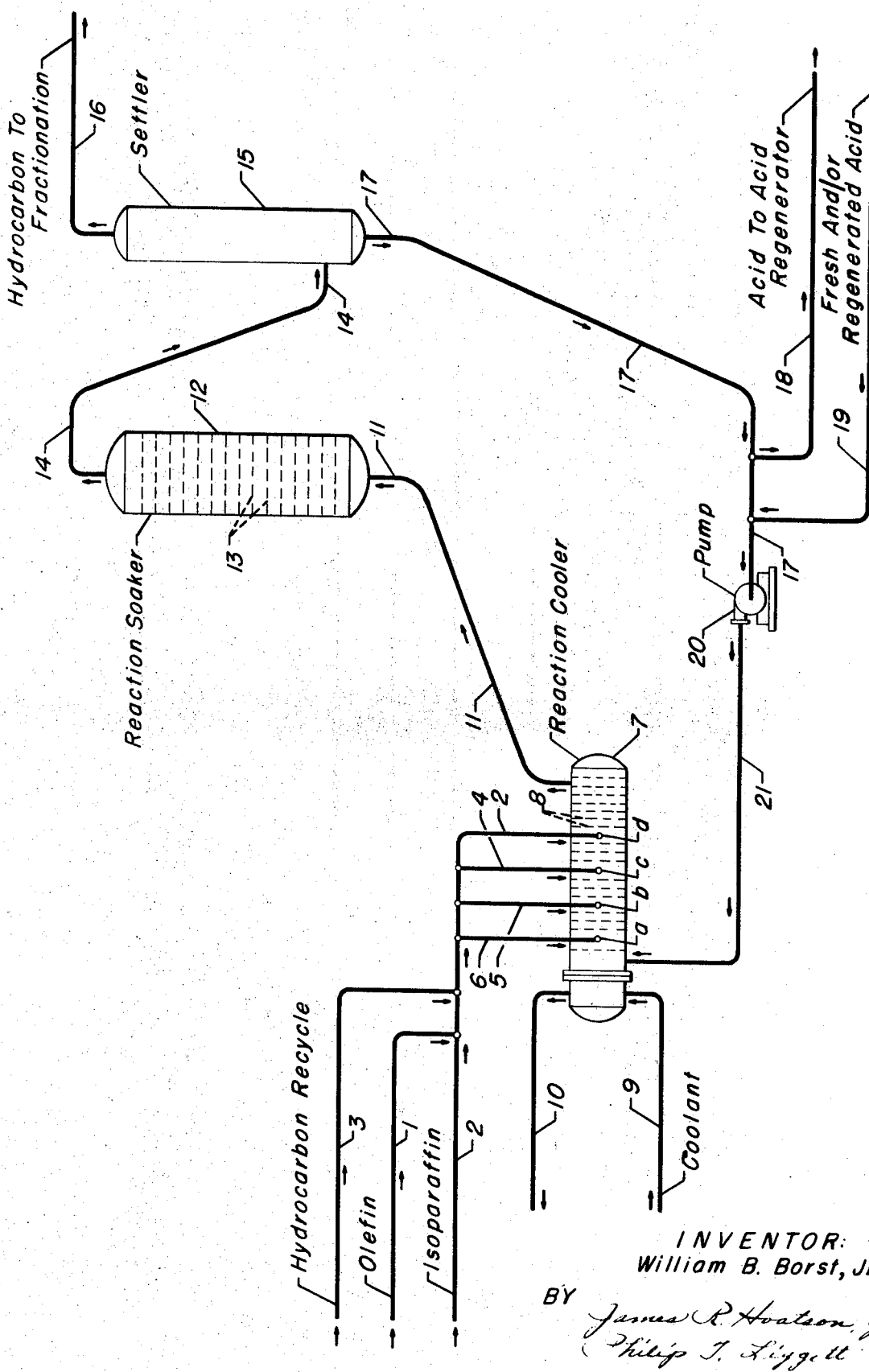

3,560,587
HYDROGEN FLUORIDE ALKYLATION WITH REACTION COOLER AND REACTION SOAKER VESSELS
William B. Borst, Jr., Mount Prospect, Ill., assignor to Universal Oil Products Company, Des Plaines, Ill., a corporation of Delaware
Filed Apr. 14, 1969, Ser. No. 815,841
Int. Cl. C07c 3/54
U.S. Cl. 260—683.48          8 Claims

ABSTRACT OF THE DISCLOSURE

An isoparaffin and olefin admixture is passed into a reaction cooler equipped with internally placed heat exchange means and spaced baffle means; the admixture is contacted with hydrogen fluoride alkylation catalyst under isothermal reaction conditions and the reaction effluent is then passed into a reaction soaker equipped with a number of spaced perforated plates therein where further alkylation takes place. The use of reaction cooler and reaction soaker vessels provides improved control of the reaction temperature and more complete alkylation reaction.

BACKGROUND OF THE INVENTION

This invention relates to a process for producing high octane alkylated hydrocarbons. It particularly relates to a process for alkylating an isoparaffin hydrocarbon with an olefin hydrocarbon. This invention specifically relates to the isothermal alkylataion of an isoparaffin with an olefin hydrocarbon utilizing a hydrogen fluoride alkylation catalyst.

Production of higher molecular weight isoparaffin hydrocarbons having valuable antiknock properties and suitable for use in automotive and aviation fuels is of considerable importance to the petroleum refinery industry.

Furthermore, the introduction of automotive engines of relatively high compression ratio has necessitated the utilization of unusually high antiknock gasolines in these engines to obtain maximum efficiency therefrom. Thus, the demand for higher and higher octane number fuels has led to increased use of higher molecular weight isoparaffin hydrocarbons as blending agents in gasolines.

A convenient source of such higher molecular weight isoparaffin hydrocarbons is found in the catalytic alkylation of relatively low boiling isoparaffin hydrocarbons, such as, for example, isobutane, with relatively low boiling olefinic hydrocarbons, such as, for example, proylene, butylene, amylenes and mixtures thereof.

It is well-known in the prior art that catalytic alkylation using, for example, hydrofluoric acid as the catalyst has become an important chemical tool for preparing alkylated compounds and derivatives thereof.

Generally, the prior art process of alkylation is accomplished by contacting an isoparaffin hydrocarbon feed stock with olefin hydrocarbons in the presence of catalyst in a reaction vessel suitable for conducting chemical reactions. In practice there have been numerous process schemes advanced by the prior art for accomplishing the alkylation reaction. The difficulty in achieving a process which embodies all of the desirable features of a completely optimum reaction is complicated by the fact that the alkylation reaction, if not carried out properly, has many side reactions such as polymerization which destroy the effectiveness of the desired reaction and inhibits the production of maximum quantities of a desired high octane alkylated product. It is known that one major contributor of the undesired polymerization is an elevated temperature. Since the alkylation reaction is exothermic in nature, the release of the heat of reaction requires careful control of the temperature within the reactor to prevent these side reactions from taking place.

Accordingly, the reactor designs of the prior art have included refrigeration equipment for maintaining the alkylation reaction medium at a temperature of, for example, 100° F. Sufficient refrigeration is embodied in such reactors so that the heat of reaction is removed as quickly as possible. Alternatively, the prior art alkylation reaction designs have included refrigeration procedures for cooling the reactants outside of the reaction zone so that the heat of reaction only elevates the reaction medium to a predetermined sufficiently low level.

SUMMARY OF INVENTION

Accordingly, it is an object of this invention to provide a process for carrying out a catalytic alkylataion reaction. It is another object of this invention to provide an alkylataion process wherein hydrogen fluoride is utilized as the catalyst and an excellent quality high octane alkylate product is produced.

It is another object of this invention to provide a process for producing high octane alkylate hydrocarbon in a more facile and economical manner.

Therefore, the present invention provides a process for producing high octane alkylated hydrocarbons which comprises the steps of: (a) introducing an isoparaffin-olefin admixture into a cooling section of an elongated reaction cooler having a predetermined number of baffle means to furnish a pressure drop of from about 5 to about 25 p.s.i. in order to maintain a homogeneous reaction mass through said cooler; (b) contacting said admixture with hydrogen fluoride alkylataion catalyst in a cooling-mixing section of said reaction cooler; (c) continuously removing heat of reaction from said reaction cooler using internally placed heat exchange means and turbulence derived therefrom to maintain regulated isothermal reaction conditions in said reaction cooler; (d) passing a reaction cooler effluent comprising catalyst, alkylated hydrocarbons and unreacted hydrocarbons to a reaction soaker having a predetermined number of soaker means to furnish a pressure drop of from about 5 to about 25 p.s.i. in order to maintain a homogeneous reaction mass through said reaction soaker; (e) further reacting in said reaction soaker said catalyst, alkylated hydrocarbons and unreacted hydrocarbons; (f) withdrawing from said reaction soaker for passage to a settler zone a total reactor system effluent comprising high octane alkylated hydrocarbons, catalyst and unreacted hydrocarbons; (g) separating in said settler zone catalyst from high octane alkylated hydrocarbons and unreacted hydrocarbons; (h) withdrawing and passing at least a portion of said catalyst of step (g) from a bottom portion of said settler zone into said reaction cooler without intervening cooling thereof and passing the remainder of said catalyst into an acid regeneration zone; and, (i) removing as overhead from said settler zone said high octane alkylated hydrocarbons and unreacted hydrocarbons for further separation and recovery in a fractionation zone.

As will be described hereinafter in greater detail, the essence of my invention encompasses the integrated and interdependent concept of utilizing as the reaction zone or reactor the combination of a reaction cooler and a reaction soaker in conjunction with a settler zone. In conjunction with this design is the requirement for a predetermined and preset geometry of the reaction cooler so that a pressure drop of from about 5 to about 25 p.s.i. to maintain a homogeneous reaction mass through the cooler can be obtained. In addition, the reaction soaker is designed with an internally preset geometry so that a pressure drop of from about 5 to about 25 p.s.i. to maintain a homogeneous reaction mass can be obtained through the reaction soaker. Further, my invention embodies introducing premixed isoparaffin and olefin hydrocarbon into a cooling section of my reaction cooler and the contacting of this admixture with hydrogen fluoride alkylation catalyst that is first distributed in my reaction cooler by means of an acid distribution baffle. Thus, the admixture contacts the hydrogen fluoride alkylation catalyst in a cooling-mixing section of the cooler. In this manner of operation, complete alkylation as well as transalkylation of the hydrocarbon reactant is achieved and a high quality octane number alkylate may be obtained from this flow scheme.

My invention can be most clearly described and illustrated with reference to the attached drawing which is a schematic representation of a specific embodiment of my invention.

DESCRIPTION OF THE DRAWING

Referring now to the drawing, olefin hydrocarbon via line 1 is premixed in isoparaffin supply line 2 to form an isoparaffin-olefin admixture. Although my process is particularly applicable to the alkylation of isobutane with a butylene-containing feedstock, the process is also applicable to other isoparaffinic hydrocarbons and other olefinic hydrocarbon feedstocks to produce motor fuel or aviation alkylates or higher boiling aliphatic alkylated compounds. Also, my process can be utilized in the alkylation of aromatic compounds such as benzene to make detergent alkylate type products. The isoparaffin hydrocarbon to be alkylated may comprise isobutane, isopentane, one or more of the isohexanes, mixtures of the aforementioned isoparaffins, as well as the branched chain heptanes and other aliphatic hydrocarbons of branched type and chain structure. Similarly, the olefinic hydrocarbon utilized as the alkylation agent in my invention comprises olefinic hydrocarbons such as propylene, 1-butene, 2-butene, isobutylene, the isomeric amylenes, the hexenes, the heptenes and higher molecular weight olefinic hydrocarbons. The isoparaffin-olefin admixture is passed via line 2 into a cooling section of an elongated reaction cooler having a predetermined number of baffle means to furnish a pressure drop of from about 5 to about 25 p.s.i. in order to maintain a homogeneous reaction mass through the cooler. The isoparaffin-olefin admixture passes via lines 2, 4, 5 and 6 in a preferred embodiment, through inlet loci (a), (b), (c), and (d) of reaction cooler 7. Inlet loci (a), (b), (c), and (d) may be, for example, spray nozzles and the like.

In a preferred embodiment, the baffle means (numeral 8) are standard exchanger type baffles and, for example, may be preset in such a manner that a pressure drop of from about 5 to about 25 p.s.i. (to maintain a homogeneous reaction mass) through the cooler is achieved. I prefer at least one baffle, utilized as an acid distribution baffle before inlet (a). I further prefer that there be at least 3 baffles between inlets (a) and (b), inlets (b) and (c), and inlets (c) and (d). Further, I prefer that at least 6 baffles be utilized after inlet (d) in my reaction cooler. By utilizing this arrangement, a pressure drop of between 10 and 15 p.s.i. through the reaction cooler can be achieved.

As described above with reference to my preferred embodiment, the purpose of a plurality of inlet loci is to inject the feed mixture into a cooling section of the reaction cooler through the catalyst phase already present in reaction cooler 7 in such a manner that the evolved heat of reaction may be removed almost immediately by heat exchange means (not shown) using coolant, such as relatively cold water, flowing through the heat exchange means via lines 9 and 10. Typically, the heat exchange means is a conventional heat exchanger using tubes for the passage of the coolant with the reaction taking place on the shell side of the heat exchanger. By operating in this manner, the alkylation reaction takes place in the immediate vicinity of the heat removal means so that regulated isothermal conditions are maintained in reaction cooler 7.

As set forth hereinabove, the feed admixture is contacted with hydrogen fluoride alkylation catalyst in a cooling-mixing section of the reaction cooler. The term "hydrogen fluoride" alkylation catalyst as used herein is intended to include catalyst wherein hydrogen fluoride is the essential active ingredient. Thus, it is within the scope of this term to use substantially anhydrous hydrogen fluoride containing various additives or promoters such as boron trifluoride. Ordinarily, commercially available anhydrous hydrogen fluoride will be charged to the alkylation system as fresh catalyst. It is, however, possible to use hydrogen fluoride containing as much as about 2.5% water by weight.

As previously noted, the heat of reaction is removed continuously from the reaction cooler using internally placed heat exchange means and turbulence derived therefrom to maintain regulated isothermal reaction conditions in the reaction cooler. The reaction conditions in the reaction cooler include an isoparaffin-olefin mole ratio of from about 1:1 to 20:1 and preferably from 3:1 to 15:1. The alkylation reaction occurs at temperatures from 0° F. to about 200° F. and preferably from 30° F. to 110° F. The pressure on the alkylation system is maintained so as to keep the reactants and catalyst in liquid phase; that is, from about atmospheric pressure to about 40 atmospheres or more and typically in the range of from about 200 p.s.i.g. to about 300 p.s.i.g. It is an essential element in the practice of this invention that the reaction cooler be designed so that a pressure drop of from about 5 to 25 p.s.i. and preferably from about 10 to 20 p.s.i. is built into the reaction cooler to provide turbulent and homogeneous mixing inside the reaction cooler. The contact time in the alkylation reaction cooler is typically less than 5 minutes, and preferably less than 2 minutes, for example, 10 to 60 seconds. The alkylation reaction is conducted in the presence of hydrogen fluoride catalyst in an amount so as to produce a catalyst-to-hydrocarbon volume ratio of 0.5 to 2.5.

The reaction cooler effluent comprising catalyst, alkylated hydrocarbons and unreacted hydrocarbons including isoparaffin and a minor amount of olefin hydrocarbon is passed via line 11 to reaction soaker 12 which contains predetermined soaker means which usually are perforated plates or decks (represented by the numeral 13) in the soaker vessel. The reaction soaker design is set so that a pressure drop of from about 5 to 25 p.s.i. and preferably from about 10 to 20 p.s.i. is built into the reaction soaker to maintain a homogeneous composition. The purpose of the reaction soaker is to build as much time as needed into the alkylation reaction so that a complete alkylation reaction can occur. The effluent charged to the soaker passes upwardly through the soaker means and the alkylated hydrocarbons and unreacted hydrocarbons continue to react in this vessel for a predetermined period. It is believed that in addition to the alkylation reaction taking place in the reaction soaker, transalkylation of low octane alkylated hydrocarbons occurs with the result that high quality, high octane alkylated hydrocarbons are obtained as the product of the transalkylation reaction in the reaction soaker. The reaction cooler effluent passing through the reaction soaker is maintained in the reaction soaker for a time depending on the composition of the particular type of effluent charged to the reaction soaker. A reaction soaker residence time of from about 100 seconds to about 1200 seconds is preferred.

A total reactor system effluent comprising high octane alkylated hydrocarbons catalyst and unreacted hydrocarbons (usually isoparaffin) is withdrawn and passed from reaction soaker 12 via line 14 to settler zone 15 wherein hydrogen fluoride alkylation catalyst is separated from the high octane alkylated hydrocarbons and unreacted hydrocarbons if any.

Settler zone 15 is a vessel free of any baffles, trays, and the like with the execption of inlet distributing means, and the hydrogen fluoride catalyst is withdrawn and passed from the bottom portion of the settler zone via line 17 and passed to reaction cooler 7 via pump 20 and line 21 without intervening cooling and at least a portion of the settled acid in line 17 is withdrawn via line 18 and passed to acid regeneration means (not shown) for regeneration of the hydrogen fluoride alkylation catalyst. In a preferred embodiment, fresh and/or regenerated acid may be added to the process via line 19, pump 20 and line 21. The regenerated catalyst may be recycled to the reaction cooler in admixture with fresh hydrogen fluoride catalyst via these same lines.

The high octane alkylated hydrocarbons and unreacted hydrocarbons are removed overhead from settler 15 via line 16 and passed to a fractionation zone (not shown) for further separation and recovery of the high octane alkylated hydrocarbons and unreacted hydrocarbon. In a preferred embodiment, at least a portion of these unreacted hydrocarbons may be recycled to the reaction cooler via line 3 in admixture with the isoparaffin-olefin admixture passing through a cooling section.

PREFERRED EMBODIMENT

In the particularly preferred embodiment of my invention, this invention provides a process for producing high octane alkylated hydrocarbons which comprises the steps of: (a) introducing an isoparaffin-olefin admixture into a cooling section of an elongated reaction cooler having a predetermined number of baffle means to furnish a pressure drop of from 10 to 20 p.s.i. in order to maintain a homogeneous reaction mass through said cooler through a plurality of inlet loci comprising from 2 to 6 inlet points longitudinally spaced intermediate the ends of said reaction cooler; (b) contacting said admixture with hydrogen fluoride alkylation catalyst in a cooling-mixing section of said reaction cooler; (c) continuously removing heat of reaction from said reaction cooler using internally placed heat exchange means and turbulence derived therefrom to maintain regulated isothermal reaction conditions in said reaction cooler; (d) passing a reaction cooler effluent comprising catalyst, alkylated hydrocarbons and unreacted hydrocarbons to a reaction soaker having a predetermined number of soaker means to furnish a pressure drop of from 10 to 20 p.s.i. in order to maintain a homogeneous reaction mass through said reaction soaker; (e) further reacting in said reaction soaker said catalyst, alkylated hydrocarbons and unreacted hydrocarbons; (f) withdrawing from said reaction soaker for passage to a settler zone a total reaction system effluent comprising high octane alkylated hydrocarbons, catalyst and unreacted hydrocarbons; (g) separating in said settler zone catalyst from high octane alkylated hydrocarbons and unreacted hydrocarbons; (h) withdrawing and passing at least a portion of said catalyst of step (g) from a bottom portion of said settler zone into said reaction cooler without intervening cooling thereof and passing the remainder of said catalyst into an acid regeneration zone; (i) removing as overhead from said settler zone said high octane alkylated hydrocarbons and unreacted hydrocarbons for further separation and recovery in a fractionation zone; and (j) recycling the unreacted hydrocarbons of step (i) to said reaction cooler in admixture with the isoparaffin-olefin admixture of step (a).

It is to be noted from the description of my invention that there is no alkylate product recycled to the reaction cooler or the reaction soaker which comprise my reaction zone. Thus, a relatively small pump 20 may be used to circulate the material between the reaction cooler and the settler. It is also noted that the acid phase in lines 17 and 21 is returned to the reaction cooler under pressure without any intervening cooling. The sole refrigeration load or cooling load on the system is maintained between internal heat exchange means associated with cooler 7. The acid is circulated in order to obtain the proper acid ratio. The feed injected through the reaction cooler is utilized to balance the heat being evolved by the alkylation reaction. The amount of feed which enters the reaction cooler can be variably adjusted between the various feed inlet ports in order to obtain optimum control of the heat being evolved in the cooler.

It is apparent that the present invention provides a process for producing high octane alkylated hydrocarbons utilizing hydrogen fluoride as the alkylation catalyst in a most economical and efficient manner. As clearly described above, this process provides excellent control of the reactor temperature so as to minimize side reactions such as polymerization from taking place and complete reaction of the reactants takes place by the time the reaction soaker effluent is withdrawn and passed into the settling zone.

I claim as my invention:

1. A process for producing high octane alkylated hydrocarbons which comprises the steps of:
   (a) introducing an isoparaffin-olefin admixture into an elongated reaction cooler, said reaction cooler having internally placed heat exchange means and having a predetermined number of spaced baffle means to furnish a pressure drop of from about 5 to about 25 p.s.i. in order to maintain a homogeneous reaction mass through said cooler;
   (b) contacting said admixture with hydrogen fluoride alkylation catalyst in said reaction cooler;
   (c) continuously removing heat of reaction from said reaction cooler using said internally placed heat exchange means and turbulence derived therefrom to maintain regulated isothermal reaction conditions in said reaction cooler;
   (d) passing a reaction cooler effluent comprising catalyst, alkylated hydrocarbons and unreacted hydrocarbons to a reaction soaker having a predetermined number of spaced perforated plates therein to furnish a pressure drop of from about 5 to 25 p.s.i. in order to maintain a homogeneous reaction mass through said reaction soaker;
   (e) maintaining said effluent in said reaction soaker for a time sufficient to complete the alkylation reaction;
   (f) withdrawing from said reaction soaker for passage to a settler zone a total reactor system effluent comprising high octane alkylated hydrocarbons, catalyst and unreacted hydrocarbons;
   (g) separating in said settler zone said catalyst from high octane alkylated hydrocarbons and unreacted hydrocarbons;
   (h) withdrawing and passing a portion of said catalyst of step (g) from a bottom portion of said settler zone into said reaction cooler without intervening cooling thereof and passing the remaining portion of said catalyst into an acid regeneration zone; and
   (i) removing as overhead from said settler zone said high octane alkylated hydrocarbons and unreacted hydrocarbons for further separation and recovery in a fractionation zone.

2. The process according to claim 1 wherein said isoparaffin-olefin admixture is formed from isobutane and an olefin having from 3 to 5 carbon atoms per molecule.

3. The process according to claim 1 wherein said isoparaffin-olefin admixture is formed from isobutane and butylene.

4. The process according to claim 1 wherein said isoparaffin-olefin admixture is passed into said reaction cooler through a plurality of inlet loci comprising from 2 to 6 inlet points longitudinally spaced intermediate the ends of said reaction cooler.

5. The process according to claim 1 wherein at least a portion of the unreacted hydrocarbons of step (i) is recycled to the reaction cooler.

6. The process according to claim 1 wherein at least a portion of the catalyst of step (h) after passing into said acid regeneration zone is recycled to the reaction cooler.

7. The process according to claim 6 wherein said catalyst is recycled to the reaction cooler in admixture with fresh hydrogen fluoride catalyst.

8. A process for producing high octane alkylated hydrocarbons which comprises the steps of:
(a) introducing an isoparaffin-olefin admixture into an elongated reaction cooler, said reaction cooler having internally placed heat exchange means and having a predetermined number of spaced baffle means to furnish a pressure drop of from 10 to 20 p.s.i. in order to maintain a homogeneous reaction mass through said cooler through a plurality of inlet loci comprising from 2 to 6 inlet points longitudinally sapced intermediate the ends of said reaction cooler;
(b) contacting said admixture with hydrogen fluoride alkylation catalyst in said reaction cooler;
(c) continuously removing heat of reaction from said reaction cooler using said internally placed heat exchange means and turbulence derived therefrom to maintain regulated isothermal reaction conditions in said reaction cooler;
(d) passing a reaction cooler effluent comprising catalyst, alkylated hydrocarbons and unreacted hydrocarbons to a reaction soaker having a predetermined number of spaced perforated plates therein to furnish a pressure drop of from 10 to 20 p.s.i. in order to maintain a homogeneous reaction mass through said reaction soaker;
(e) maintaining said effluent in said reaction soaker for a time sufficient to complete the alkylation reaction;
(f) passing from said reaction soaker to a settler zone a total reactor system effluent comprising high octane alkylated hydrocarbons, catalyst and unreacted hydrocarbons;
(g) separating in said settler zone said catalyst from octane alkylated hydrocarbons and unreacted hydrocarbons;
(h) withdrawing and passing a portion of said catalyst of step (g) from a bottom portion of said settler zone into said reaction cooler without intervening cooling thereof and passing the remaining portion of said catalyst into an acid regeneration zone;
(i) removing as overhead from said settler zone said high octane alkylated hydrocarbons and unreacted hydrocarbons for further separation and recovery in a fractionation zone; and,
(j) recycling the unreacted hydrocarbons of step (i) to said reaction cooler in admixture with the isoparaffin-olefin admixture of step (a).

References Cited
UNITED STATES PATENTS

| | | | |
|---|---|---|---|
| 2,416,395 | 2/1947 | Kuhn, Jr. | 260—683.48 |
| 2,632,031 | 3/1953 | Matuszak | 260—683.48 |
| 3,108,048 | 10/1963 | McDonald | 260—683.48 |
| 3,249,650 | 5/1966 | Fenske | 260—683.48 |
| 3,501,536 | 3/1970 | Borst, Jr. | 260—683.48 |

DELBERT E. GANTZ, Primary Examiner

G. J. CRASANAKIS, Assistant Exxaminer